Sept. 4, 1962    E. ANDERSON ETAL    3,052,588
METHOD OF AND APPARATUS FOR MAKING CONTAINER CLOSURES
Original Filed Dec. 20, 1952    3 Sheets-Sheet 1
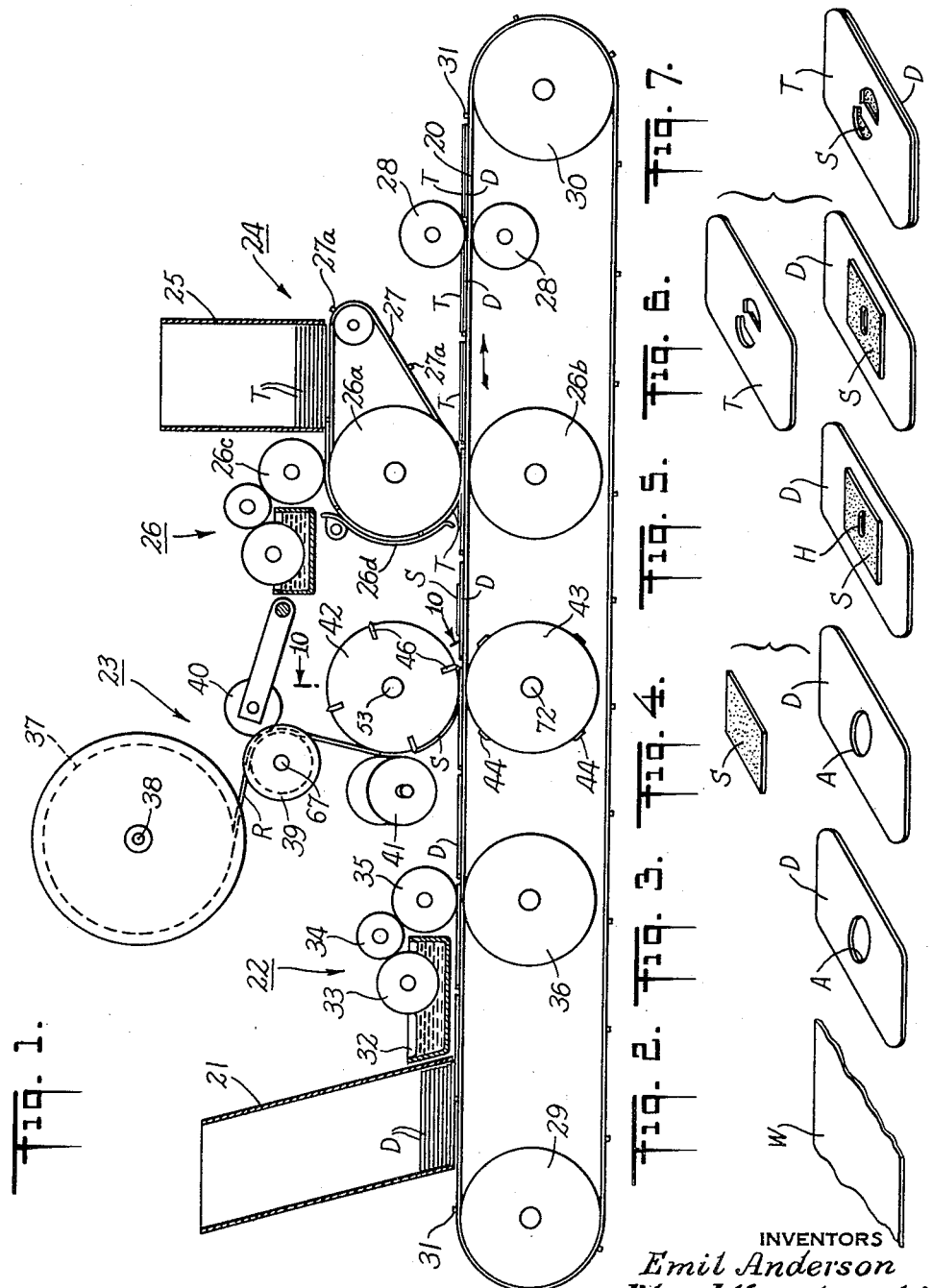
INVENTORS
Emil Anderson
John J. Kowalewski
BY Thomas C. Bitts
ATTORNEY

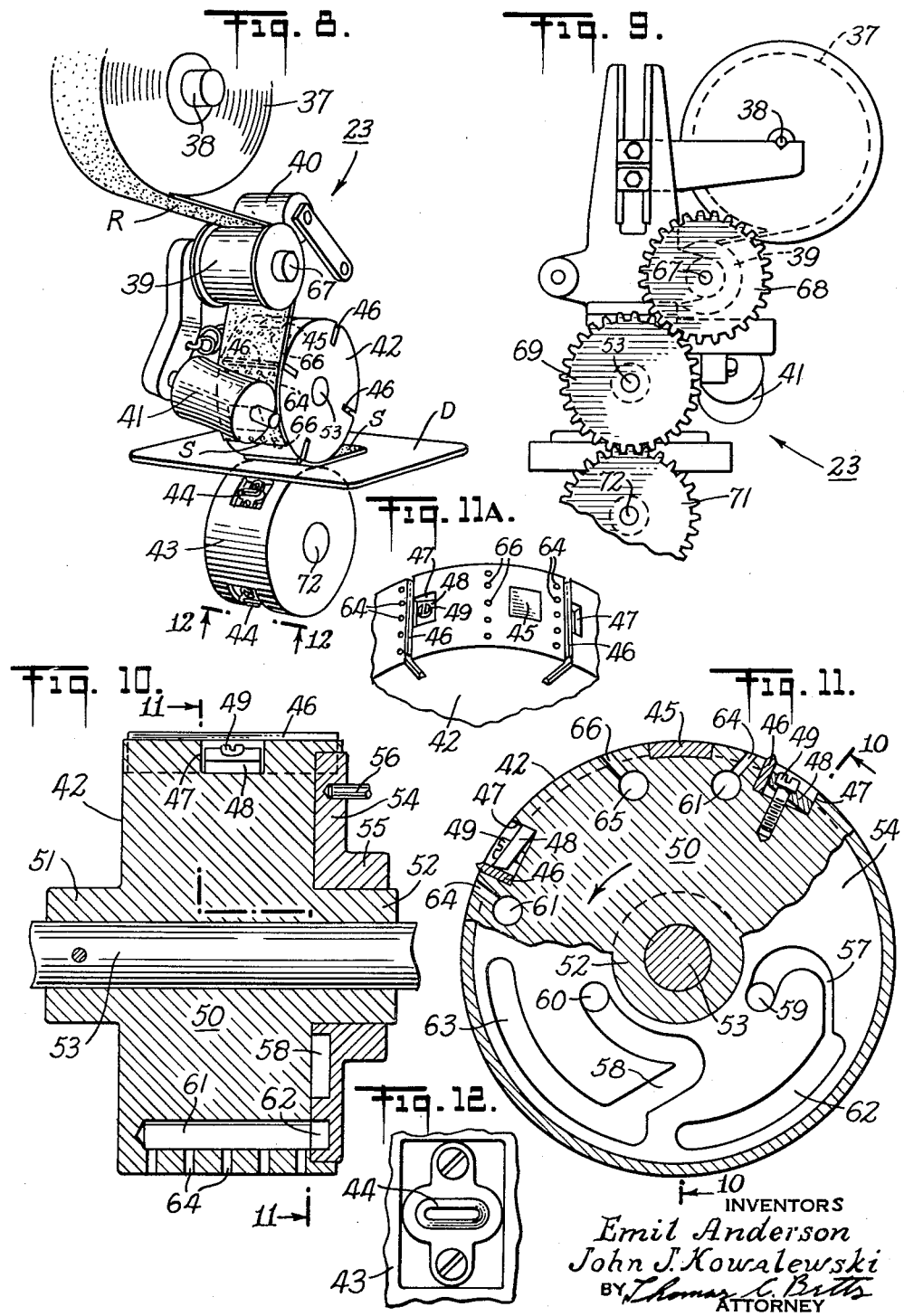

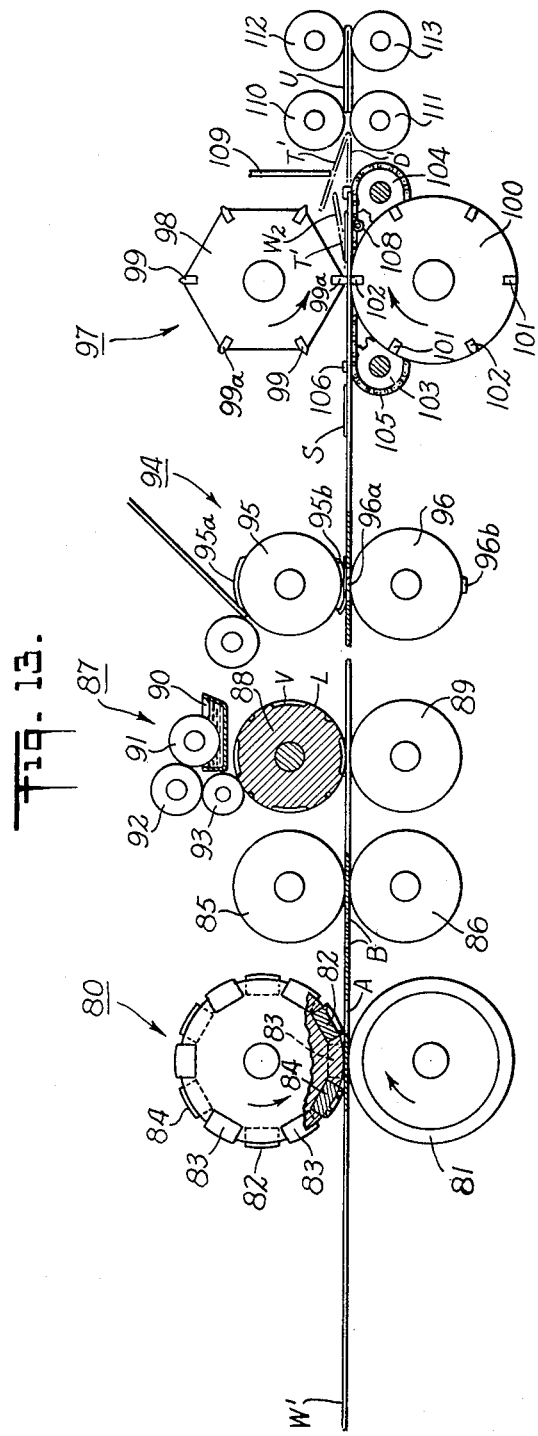
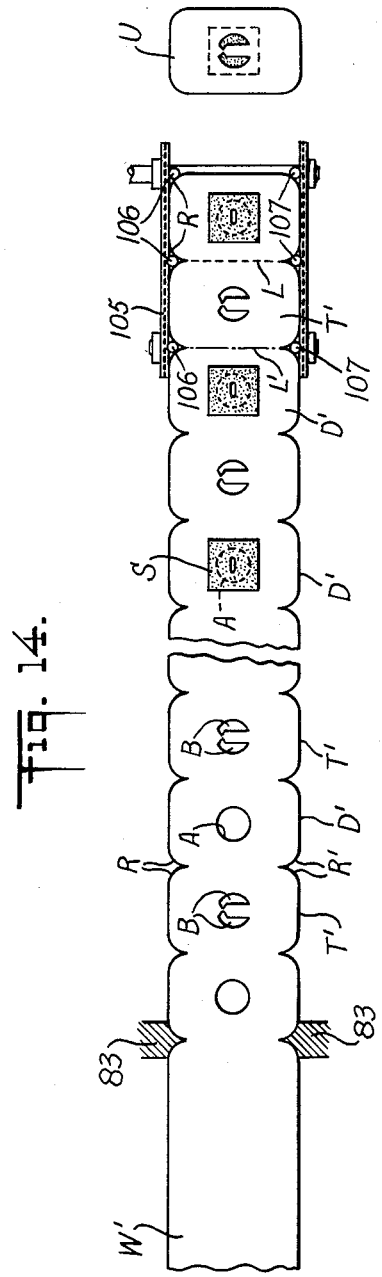

United States Patent Office 3,052,588
Patented Sept. 4, 1962

3,052,588
METHOD OF AND APPARATUS FOR MAKING CONTAINER CLOSURES
Emil Anderson, Ossining, N.Y., and John J. Kowalewski, Riverside, Conn., assignors to Electrolux Corporation, Old Greenwich, Conn., a corporation of Delaware
Original application Dec. 20, 1952, Ser. No. 327,132, now Patent No. 2,895,551, dated July 21, 1959. Divided and this application July 5, 1957, Ser. No. 670,146
5 Claims. (Cl. 156—252)

This application is a division of our copending application Serial No. 327,132 filed December 20, 1952, now Patent No. 2,895,551 issued July 21, 1959.

Our invention relates to an improved disposable porous dust container for use in a suction cleaner and to an improved method of and apparatus for making the same.

The practical utilization of disposable porous dust containers, rather than the conventional cloth dust bag which is emptied and used over and over again, is of relatively recent origin. It is highly desirable to provide a disposable container of this type with means for sealing the container prior to removing it from the cleaner in order to avoid spilling dust and other contents during its removal and disposal. Such a container is disclosed in U.S. Patent No. 2,596,808 of G. E. Lofgren issued May 13, 1952.

It is accordingly among the objects of our invention to provide an improved self-sealing container as well as an improved method of and apparatus for making it.

In the practice of one form of our method, a cardboard sheet is fed into a stamping machine which blanks out pairs of attached oblong discs. One disc of each pair is formed with a substantially circular central hole, while the other is formed with a similar hole, but with a tongue or strip of material remaining across the center thereof. The discs are serially fed as, for example, by feed rollers or an endless belt and an adhesive is applied to one side of each disc. While the discs are being coated with adhesive, a web of thin rubber is metered from a supply roll and led to a cutting device which cuts off successive rubber strips or patches. The rubber web is, however, fed at a velocity which is less than the velocity of the discs, with the result that the length of the rubber strip is less than that of the disc. As each successive rubber strip is cut, it is carried against the coated face of one disc of a pair, and is adhered thereto, while at the same time a small aperture is cut in each rubber strip, this aperture registering with the one in the disc, but being smaller.

After the rubber strip is pasted or glued to its disc, the pair of discs continues to travel through the machine to a station where one disc of the pair is folded over with its coated face against the coated face of the other disc and with the rubber strip therebetween. Preferably, prior to the folding a score line is provided between the discs of each pair in order to facilitate folding at the proper place so as to bring the holes of the respective discs into registry. The thusly completed disc is then fed to a receiving hopper, or may be fed directly into a machine wherein each disc is glued to the specially prepared open end of a porous paper container, thus to complete the container. If desired the disc may be manually glued to the container.

In the drawing, wherein is illustrated the several steps of our method, and also two different types of machines for carrying it out.

FIGURE 1 is a diagrammatic side elevation of one form of the machine;

FIGURES 2-7 illustrate successive steps of our method;

FIGURE 8 is a diagrammatic perspective view of the apparatus by which the rubber is cut into strips;

FIGURE 9 is a side elevation of the rubber web feeding mechanism showing the drive mechanism;

FIGURE 10 is an enlarged fragmentary sectional elevation taken along the line 10—10 of FIGURE 11 and showing certain details of the drum which both cuts and feeds the rubber strips;

FIGURE 11 is a staggered section taken along the line 11—11 of FIGURE 10;

FIGURE 11a is a fragmentary perspective view of the element shown in FIGURE 11;

FIGURE 12 is a fragmentary top plan view of a portion of the lower roller shown in FIGURE 8;

FIGURE 13 is a diagrammatic, fragmentary side elevation of a modified form of the machine by which our method may be practiced; and, FIGURE 14 is a fragmentary plan view looking down on the paper web shown in FIGURE 13 as it passes through the machine.

Similar reference characters refer to similar parts throughout the views of the drawing.

Referring now to FIGURE 1, the machine in general includes two spaced parallel endless chains 20 which are driven in the direction of the arrow beneath a hopper 21 in which is stored a supply of cardboard discs D. The chains feed the discs from the hopper under a coating device generally indicated at 22 which coats the top side of each disc with suitable adhesive as it passes thereunder. Generally indicated at 23 is a rubber strip feeding mechanism which cuts successive strips S (see FIG. 4) from a rubber web R and applies them to the coated faces of discs D successively as the discs travel beneath the mechanism 23. At 24 we have generally indicated a mechanism including a hopper 25 which receives a store of tag stock discs T, these tag stock discs being serially fed from their hopper through a coating device 26 by means of a chain 27 having pickers 27a downwardly to chains 20 where the tag stock discs are successively glued to the tops of the underpassing discs D. The thus assembled discs pass through pressure rollers 28 either to a storage hopper or directly to a machine (not shown) where they are applied to the specially prepared open ends of porous bags or containers thus to complete the disposable dust container.

More particularly, chains 20 are trained about sprockets 29 and 30, either of which may be driven in any suitable manner to impart clockwise velocity to the belt. Preferably chains 20 are provided with a series of pickers 31, each opposed pair of which, as they pass beneath hopper 21, pick up one disc D and feed it from left to right, as viewed in FIGURE 1, toward coating device 22. This device includes a glue pot 32, a pickup roller 33, a transfer roller 34 and an applicator or printing roller 35, the transfer roller being in engagement with the pickup and applicator rollers 33 and 35. Thus, as each disc passes beneath applicator roller 35, its upper surface, or at least that portion which receives strip S, is coated with the adhesive material from glue pot 32. Disposed beneath appliactor roller 35 is a pair of idler supporting sprockets 36 for supporting chains 20 and accordingly disc D against the downward pressure of applicator roller 35 as the disc passes thereunder. Roller 35, sprockets 36 and chains 20 accordingly coact in advancing the disc through the device 22 toward the rubber strip feeding mechanism 23.

This rubber strip applying device 23 is more clearly shown in FIGURE 8. Here it will be seen that the rubber web R is fed from a supply roll 37 mounted in any suitable manner as on an axle 38. If desired a braking device (not shown) may be applied to prevent free rotation of the supply roll 37. Disposed below and preferably to one side of the center of axle 38 is a driven metering roller 39 and also an idling pressure roller 40, the latter roller pressing the rubber web R against the metering roller. As will be described hereinafter, metering roller 39 drives web R at a velocity somewhat less than the velocity of discs D (FIGURE 1).

Disposed below the rollers 39 and 40 is another pair of rollers 41 and 42, the former of which is hollow ground and idles on an axis inclined with respect to the axis of roller 42. These two rollers do not engage, the spacing therebetween being slightly in excess of the thickness of rubber web R, and the inclination of roller 41 being such that when the rubber web lies between these two rollers 41 and 42 there would be a substantially straight line contact between the hollow ground surface of roller 41 and the rubber web were they in engagement. This roller 41 accordingly comprises in effect a cutting block, as will be described.

Roller 42 is a somewhat complex mechanism that not only cuts the rubber web R into strips of the proper length, but also carries each severed strip or patch S downwardly against disc D for application to the coated side thereof, the disc being approximately supported by an underlying roller 43 which is driven in synchronism with roller 42. The roller 43 also carries a series of dies, such as die 44 (FIGURES 8 and 12), which extend into the central apertures in the discs D and cut the oblong holes H in the strips or patches S during the application thereof to the discs, the roller 42 being provided with hardened backing plates 45 (FIGURE 8) against which the dies 44 engage successively, thus to facilitate cutting the holes H. By cutting the hole during or after the application of each patch S to a disc D, it is assured that the hole H is properly aligned with the hole A in the disc because the disc is always located properly with respect to the die 44 by means of the pins 31 on the conveyor chains 20. If the hole H were to be cut prior to application of the patch to the disc, for example at the same time that the patch is severed from the web R, it would then be necessary to accurately locate the patch on the disc in order to have the holes H and A in proper alignment. Due to the elastic nature of the rubber, such accurate locating is difficult, and consequently it is advantageous to render it unnecessary.

In order to cut successive strips from rubber web R, roller 42 is provided with a series of knives 46, preferably spaced around roller 42 in quadrature. As is more clearly shown in FIGURE 11, a series of grooves 47 are cut in the periphery of roller 42, and in each of these grooves is received a knife blade 46, the knife being held in the groove by a wedging strip 48 and screw 49. Thus, as roller 42 (FIGURE 8) rotates counter-clockwise, each of the knives 42 eventually reaches approximately the 9 o'clock position, where it bears against the backing roller 41, and accordingly cuts through web R to form rubber strip S. For efficient operation, the edge of each blade projects beyond the periphery of roller 42 by an amount substantially equal to the spacing between rollers 41 and 42, so that when the blade engages the rubber, the rubber is severed by a sort of rolling squeezing action.

After the strip S is severed from the web R it is, of course, necessary to transport it downwardly to the point where it is applied to the coated surface of disc D, and to this end roller 42 is provided with suction and pressure passages which will now be described. As shown in FIGURE 10, roller 42 includes a main body portion 50 and hub portions 51 and 52, the former of which is pinned to a shaft 53, by which the roller is driven. The right-hand face, as viewed in FIG. 10, of roller body 50 is recessed to receive a cap 54 having a hub 55 mounted on roller hub 52, the cap being held against rotation in any suitable manner as, for example, by a pin 56 or the like secured to the machine frame (not shown) and extending into a suitable hole or slot in the cap. Thus, roller 42 will rotate relative to cap 54. The inner surface of cap 54, as shown in FIGURE 11, is milled to provide two channels 57 and 58, provided respectively with connections 59 and 60 to pressure and exhaust lines. In roller body 50, adjacent each of blades 46, is formed a transverse air duct 61 which, as shown in FIGURE 10, is closed at one end and open at the other, and registers successively with chambers 63 and 62 (FIGURE 11) in cap 54 as hub 50 rotates. Thus each duct 61, during rotation of roller 42, first communicates with exhaust chamber 63 and then with pressure chamber 62. Each duct 61 also communicates with atmosphere by way of drilled holes 64 (see also FIG. 11a) just ahead of a blade 46 in the direction of rotation of roller 42 and hence these holes successively exert negative and positive air pressure. There are four of these ducts 61 formed in the roller body. Additionally, there are provided four intermediate ducts, such as duct 65, which is located on the same radius as ducts 61, but substantially midway between adjacent knife blades 46, and communicates with atmosphere by way of holes 66 (see also FIG. 11a), which are similar to holes 64 and are located preferably about midway of adjacent blades 46. It accordingly follows that as roller 42 rotates relative to cap 54, duct 61 (FIGURE 11) registers with the upper end of exhaust chamber 63, and accordingly communicates therewith until it leaves the lower end of the chamber. Before this occurs, however, succeeding duct 65 registers with the chamber so that each of the ducts 61 and 65 are under negative pressure, creating a suction effect at the outer ends of holes 64 and 66, respectively. If then the rubber web R (FIGURE 8) is adjacent the periphery of the roller 42 while the two ducts are in communication with chamber 63, the rubber will be sucked tightly against the periphery of the roller and carried around with it.

When duct 61 registers with chamber 62 (FIGURE 11), at which time the leading end of the severed strip S is at the 6 o'clock position, positive air pressure is exerted at the openings of holes 64, forcing the rubber strip away from the periphery of the roller and against the adhesive surface of the disc D, thus in effect permitting the strip to be peeled from the roller as it continues to rotate. Then when the following duct 65 (FIGURE 11) registers with chamber 62, its holes 66 exert a positive pressure, thus freeing the trailing end of the strip from the periphery of the roller, and accordingly assuring its adhesion to the coated disc D. As previously mentioned, of course, the die 44 cuts the hole H in the rubber strip when it reaches the 6 o'clock position. As hereinabove noted, rollers 39, 42 and 43 are positively driven, the driving mechanism for these rollers being shown in FIGURE 9. Thus, metering roller 39 is fastened to a shaft 67, to which shaft is also secured a gear 68. This gear meshes with a gear 69, fastened to shaft 53, to which roller 42 is attached. Gear 69, in turn, meshes with a gear 71 fastened to a shaft 72, to which roller 43 is attached, and this latter gear 71 may be driven by any suitable means. Thus each of gears 71, 69 and 68, and accordingly their respective rollers 43, 42 and 39 are driven at the same r.p.m. As rollers 42 and 43 are of the same diameter, their peripheral velocities are the same. Metering roller 39, however, is of lesser diameter, and hence has lesser peripheral velocity, and this velocity is of lesser value than the velocity of belt 20 (FIGURE 1) and accordingly of discs D, the velocity of discs D being the same as the peripheral velocities of rollers 42 and 43. It accordingly follows that what might be termed the feed velocity of rubber web R (FIGURE 8) from metering roller 39 is less than the peripheral velocities of rollers 42 and 43 and the velocity of disc D. By reason of this factor, it is possible to apply to each of discs D a strip S whose length is shorter than that of disc D.

The operation of the rubber web feeding and applying mechanism 23 (FIGURE 8) will perhaps be best understood by describing how this portion of the entire machine is initially set into operation. A length of the web R is drawn from roller 37 and is threaded between rollers 39 and 40 and rollers 41 and 42, preferably with one of the knife blades 64 located in approximately the 9 o'clock position. If then the machine is put into operation, the air holes 64 and 66 in roller 42 which are located between the knife blades at the 9 o'clock and 6 o'clock positions will be at negative pressure and accordingly will tend to suck the web against the periphery of the roller. Then, as this roller rotates until the knife blade 46, which started at approximately the 9 o'clock position, comes against the backing roller 41, that portion of the web will be sucked against the periphery of the roller. In the meantime, the holes 64 and 66 trailing the knife blade will be inactive. Just as the knife blade 46 passes the 9 o'clock position, where it cuts off the web by bearing against the backing roller 41, the next series of holes 64 will be at approximately the 10 o'clock position, where they exert neither negative nor positive pressure effect. Indeed, they cannot exert any pressure effect until they reach or just pass the 9 o'clock position, as hereinbefore described, where their duct 61 (FIGURE 11) registers with exhaust chamber 63. While this row of holes is traveling from the said 10 o'clock to the 9 o'clock position, metering roller 39 continues to feed web R between and through rollers 41 and 42 at such a velocity that its free end hangs below the 9 o'clock position when the next group of holes 64 reaches the 9 o'clock position. At this time, the group of holes 64 exerts negative pressure, and accordingly sucks the free end of the web against the periphery of roller 42, and as the roller continues to rotate holes 66 also exert negative pressure, by reason of their duct 65 (FIGURE 11) registering with exhaust chamber 63. This negative pressure obtains until the following knife blade 46 cuts off the next strip by bearing against backing roller 41.

At about the time this occurs, the leading end of the previously cut off strip S approaches the 6 o'clock position at which point the suction holes 64, or rather their duct 61, registers with the entrance end of pressure chamber 62. At this time the vacuum is cut off and positive pressure forces the leading end of the strip against the coated disc D which is being fed between rollers 42 and 43. Then when the duct 65 for the following holes 66 registers with the entrance end of pressure chamber 62, the strip S is completely released from the periphery of roller 42 so that the strip is securely pasted against the coated surface of disc D by the rollers 42 and 43.

From the foregoing, it will appear that the rubber web R is fed from the supply roll 37 by metering roller 39 as a velocity whose value is less than the peripheral velocities of rollers 42 and 43, and accordingly that of disc D. Hence it is possible to cut off and apply to disc D rubber strips S, the length of each of which is determinably less than that of disc D. In other words, the length of rubber strip S can be varied as desired by varying either the r.p.m. or the diameter of metering roller 39.

Following the application of a strip S to a disc D, the disc with strip attached continues to be advanced by the chains 20 and passes between rollers 26a and 26b. Each of these rollers is driven by suitable gearing so as to have a peripheral speed equal to the linear speed of the disc as advanced by the chains 20. Consequently, the chains 27, which are driven by the roller 26a, move at the same speed. As previously stated, these chains carry pickers 27a which pick up and move along with the chains a disc T of tag stock from the bottom of the stack of such discs in the hopper 25. The discs T are of the same configuration as the discs D, except that the center aperture is formed with a tongue extending thereacross having a weakened section at one end, as is shown in FIG. 6. The upper surface of each disc T is coated with adhesive by the printing roller 26c of the coating device 26. The coated disc is then carried by the chains 27 around the roller 26a, a curved plate 26d being provided for preventing the disc from falling off the chains, and meets a disc D being advanced by the chains 20. The two discs are pressed together by the rollers 26a and 26b and thus are adhered to each other with the previously applied rubber strip S between them.

The completed disc assembly is then advanced further by the chains 20 and may be passed between additional pressure rollers 28. These disc assemblies are now in condition to be secured in any suitable manner to bags of porous material to thus form complete dust containers of the type shown in the above-identified Lofgren patent.

We have chosen to describe first in some detail the structure and operation of the apparatus to clarify the novel features of our method. Referring to FIGURES 2-7, a cardboard web W is fed through suitable stamping dies which stamp from the web a blank in the form of disc D (FIGURE 3) having an aperture A. This disc is fed at a uniform velocity, and during its travel its upper side is coated with a suitable adhesive as, for example, by means of the coating device 22 (FIGURE 1). As the disc D is fed at this uniform velocity, a web of thin sheet rubber is fed from a suitable source of supply at a lesser velocity than that of the movement of disc D and cut at the appropriate time so that a strip S of lesser width than disc D is formed. This strip S is transported in timed relation to the travel of disc D and applied to the adhesive coated surface of the disc so as to be centered over the aperture A, as shown in FIGURE 5. At the time of the application of rubber strip S to the disc D, a slot H is punched in strip S in such manner that the center of the slot and the center of aperture A are in registry. The disc with the applied strip is then transported to a station where the tag stock disc T which, as noted before, is of the same size and shape as disc D, is applied with its coated side to the disc D. The discs T and D are then subjected to pressure which causes firm adhesion between the two and the assembled disc is discharged either to stock or to a machine (not shown) whereby the disc is pasted to the properly prepared end of a porous container or bag. The disc can, of course, be pasted to the bag by hand after which the normally open end of the bag is sealed in any suitable manner thus to complete the bag such as that shown in the aforementioned Lofgren patent.

It will accordingly appear from the foregoing that the ultimate assembled disc can be formed with a high degree of precision and rapidity, and that by virtue of the simplicity of the steps of the method and the structural characteristics of the machine a high efficient operation is made possible.

In FIGURES 13 and 14 is shown an apparatus by which a modified form of our method may be carried out to produce an improved disc. In this form of our method, a cardboard web is fed into one end of the machine wherein there are alternately formed disc sections D' and T' of the same configuration as discs D and T (see FIGURES 3 and 6), these discs, however, not being severed at the time of the formation thereof. The thusly formed discs are further fed along beneath a printing roll where suitable adhesive is coated on the discs. The coated discs continue to be fed along for the subsequent application to one of them of a perforated rubber strip or patch similar to strip S (FIGURE 4). Thereafter the web is first severed and then scored at successive dividing lines, respectively, between adjacent disc sections T' and D', whereafter the leading section is inverted 180° around the scoring so that subsequently its surface which had previously been coated with adhesive can be pressed against the surface of the following disc section so as to firmly adhere thereto. The thusly assembled unit may thereafter be delivered to stock or may be fed into a machine for applying the unit to a paper bag, as hereinbefore discussed, or, if desired, the unit may be pasted to the bag by hand. Due to the fact that the completed disc comprises two disc sections from the same sheet of material folded back to back, any tendency of the material to curl or warp tends to cause the two sections to curl in equal amounts but in opposite directions, resulting in the forces counteracting each other.

Referring now to FIGURE 13, a stamping roller, generally indicated at 80, is rotatably disposed over a supporting roller 81, both of which are driven in the direction indicated by the arrows, in any suitable manner. Stamping roller 80 illustratively carries four sets of cutters, each set comprising cutters 82, 83 and 84. Cutter 82 is so shaped as to stamp out hole A (FIGURE 14) in that portion of the web W' which ultimately will comprise disc section D'. Cutter 84 is so shaped as to stamp in disc section T' of web W' two perforations, indicated at B and separated by a tongue having a weakened section at one end. Cutter 83 is so shaped as to form the radii R and R' between adjacent disc sections D' and T', it being noted, however, that the web is not severed at the time these radii are formed, the web accordingly being continuous as to feed further through the machine. The number of cutters 83 on the stamping roller is equal to the sum of the cutters 82 and 84, a cutter 83 being disposed between adjacent cutters 82 and 84, as shown in FIG. 13.

It might be noted at this point that the gauge of web W' is less than that of web W (FIGURE 2), but greater than that of the stock from which the tags T (FIGURE 6) are formed, twice the thickness of web W' substantially equalling the combined thicknesses of discs D and T so that the thickness of the ultimate assembled unitary disc in each instance is approximately the same.

A pair of drive rollers 85 and 86 (FIGURE 13) is provided to embrace web W' subsequent to the action of stamping roller 80 and feed it toward a glue applicator, generally indicated at 87. This applicator comprises a printing roller 88 and a supporting roller 89, each of which is preferably driven in any suitable manner so that their peripheral velocities are the same and the same as the linear velocity of web W'. Applicator 87 also includes a conventional glue pot 90, pick up roller 91, transfer rollers 92 and 93 the latter of which apply the glue or other adhesive to the surface of printing roller 88. It will be noted that printing roller 88 is provided with alternate lands L and valleys V, with only the lands engaging transfer roller 93. These lands and valleys are so arranged and formed that as web W' passes between rollers 88 and 89, the glue or adhesive is applied to the then underlying disc D' or T', for example T', on the surface thereof surrounding the perforation B, thus maintaining the surface of supporting roller 89 free from adhesive.

The thusly coated discs thence proceed to a rubber web feeding and applying mechanism, generally indicated at 94. This mechanism is substantially similar to mechanism 23 (FIGURE 1), differing only in that two rubber strips or patches are applied per cycle of operation of the mechanism. Thus the mechanism comprises a cutting and applying roller 95, and an underlying supporting roller 96, the former of which is substantially similar to roller 42 (FIGURES 8 and 11), except that it has but two rubber strip applying stations 95a and 95b. Lower supporting roller 96 (FIGURE 13) is generally similar to roller 43 (FIGURE 8) except that it is provided with but two dies 96a and 96b. In all other important respects, mechanism 96 resembles both structurally and operationally mechanism 23 (FIGURE 8). It accordingly follows that as web W' (FIGURE 13) continues through the machine and passes between rollers 95 and 96, rubber strips S (FIGURE 14) are applied to alternate disc sections, preferably disc sections D', the strip or pitch accordingly being pasted to the top surface of disc section D' over its perforation A.

After leaving the mechanism 94, the web, with the rubber patches 16 applied thereto, is fed to a cutting and scoring mechanism, generally indicated at 97 in FIGURE 13. This mechanism comprises a rotatable carrier 98, in the periphery of which are installed alternate cutting off knives 99 and scoring dies 99a. Rotatably disposed below member 98 is a roller 100, which carries alternate backer blocks 101, which coact with knives 99, and backer plates 102, which coact with scoring dies 99a. Both member 98 and roller 100 are driven in any suitable manner in the directions of the arrows, and are so timed that cooperating cut-off knives 99 and backing blocks 101 register at their 6 and 12 o'clock positions, respectively, during the rotation of their respective carriers. Upon the meeting of a knife and block, the web is severed along a line L, which preferably, but not necessarily, defines the trailing edge of disc section D', and the leading edge of disc section T'. After the web is cut along line L, as noted, the web continues to feed and the members 98 and 100 continue to rotate until a scoring blade 99a and a backing plate 102 register and score the web along the line L', which has advanced to the previous position of line L, the web thus being scored between disc sections T' and D' sufficiently to permit disc section T' to be readily folded back over disc section D', as will be described hereinafter.

In view of the fact that the web is severed at line L as described, it is necessary to provide additional web transporting mechanism. To this end, suitable driven sprockets 103 and 104 are provided, and trained about these sprockets are chains 105 carrying, as more clearly shown in FIGURE 14, pins 106 and 107 properly spaced so as to engage in the opposed notches of the web formed by radii R and R'. It accordingly follows that after the web is severed along line L, the pins 106 and 107 continue to feed the severed pair of disc sections to the right.

As noted above, the web is scored along the line L' when that line is in the 6 and 12 o'clock positions, respectively, of scoring blade 99a and backing plate 102. At this time the leading and severed end of the web is at the position indicated at $W_2$ so that the body of disc section T' overlies an air jet 108. Streams of air are directed upwardly from jet 108 against the bottom of disc section T', causing this disc section to pivot counterclockwise about the score line L' until the leading web edge $W_2$ is lifted high enough to enagage an abutment plate 109. The severed disc sections D' and T' continue to be fed to the right, as viewed in FIG. 13, by opposed pins 106 and 107. This causes disc section T', the edge of which is in engagement with plate 109, to be pivoted about the score line, first to a vertical position against the plate and then as the score line passes beneath the bottom edge of plate 109, the disc section T' is finally folded almost against the top of disc section D', as shown by the dotted line position in FIGURE 13. As the disc sections T' and D' continue to move to the right, they pass between a pair of pressure rollers 110 and 111 which are driven in any suitable manner. These rollers grip the leading edge of the two disc sections, continuing the travel thereof to the right, and ultimately through the final sealing rollers 112 and 113 which securely press the two disc sections together to form the ultimate disc unit U (see FIGURE 14), it being remembered that adhesive previously has been applied to one of the disc sections, such as T', by the printing roller 88.

It may now be seen that the disc unit may be practically and efficiently formed by treating a single cardboard web in such a manner as to embrace the rubber sealing strip S. As the units U are delivered from the delivery end of the apparatus, shown in FIGURE 13, they may be fed directly into the hopper of a machine (not shown) which adheres the disc unit to the container, or the disc unit may be fed into a storage hopper of any suitable sort, or it may be otherwise delivered for manual application to the container.

We have accordingly provided an improved container and method and apparatus for making same in a thoroughly practical and efficient manner, but it is to be understood that the foregoing examples have been given for purposes of illustration only and are not to be considered as limiting the scope of our invention, which is to be determined by the appended claims.

Certain subject matter disclosed but not claimed in the present application constitutes the claimed subject matter of our copending divisional application Serial No. 815,186, filed May 22, 1959.

What we claim is:

1. In a method of forming container closures having an apertured patch of elastic material laminated between a pair of apertured supporting discs, the three apertures being in registry, the steps of cutting the discs from a sheet of material without severing the discs of each pair and cutting an aperture in each disc, coating adhesive on at least one disc of the pair, applying a patch of elastic material to the coated disc over the aperture therein, cutting an aperture in the patch in a position to be in alignment with the aperture in the coated disc, cutting a score line in the material of each pair of discs midway between the apertures in the respective discs of the pair, folding over one of the discs of the pair along said score line against the other disc with the aperture patch therebetween and with the apertures of the discs in registry, and pressing them together to cause the discs to adhere.

2. In a method of forming a container closure from relatively stiff sheet material the steps of defining a section of the sheet material comprising a pair of attached discs, forming an aperture in each disc, coating a face of one of said discs with adhesive, applying a patch of elastic material to said coated face over the aperture in the corresponding disc, said patch having an aperture therein smaller than the aperture in said corresponding disc, the operation of defining the said section including forming a middle score line to measure off the individual discs of the pair, folding over the two discs into face to face engagement with the said patch therebetween, said apertures and the score line having been located to cause the apertures to be in registry in the said folded relation of the discs, and securing the discs together as a laminated unit.

3. A method of forming container closures comprising the steps of cutting a pair of joined discs from a sheet of material, cutting a single aperture on one disc of the pair and a pair of apertures separated by a strip of material in the other disc of the pair, securing a patch of elastic material to one of said discs so as to cover and extend beyond the apertured area thereof, the patch having an aperture therethrough in alignment with the apertured area of the disc, forming a score line in the material of the pair of discs midway between the apertured areas in the respective discs, folding over one of the discs of the pair along said score line against the other discs with the single aperture of said one disc in registry with the pair of apertures in said other disc, and securing said discs together with said patch secured therebetween.

4. In a machine for forming container closures having an apertured patch of elastic material laminated between a pair of apertured supporting discs, means for cutting discs in attached pairs from a sheet of material and for cutting apertures of substantially equal size in each disc of the pair, means for applying a coating of adhesive on at least one disc of the pair, means for applying a patch of elastic material to the coated disc over the aperture therein, means for cutting a smaller aperture in the patch, said last-mentioned means being so positioned and related to the coated disc as to locate the said smaller aperture in alignment with the aperture in the coated disc, means for folding over one of the discs against the other with the apertures of the discs in registry with the apertured patch therebetween, means for pressing the discs together to cause them to adhere, and a power operated system connected to operate the several said means in timed relation to each other and in appropriate sequence.

5. In a machine for forming container closures, means for feeding a strip of sheet material along a predetermined path, and a series of means arranged along said path and operated in timed relation for performing operations on said strip in appropriate sequence, said series including means for cutting discs in attached pairs from said strip and for cutting apertures of substantially equal size in each disc of the pair, means for applying a coating of adhesive on at least one disc of the pair, means for applying a patch of elastic material to the coated disc over the aperture therein, means for cutting a smaller aperture in the patch, said last-mentioned means being so positioned and related to the coated disc as to locate said smaller aperture in alignment with the aperture in the coated disc, means for folding over one of the discs against the other with the apertures of the discs in registry with the apertured patch therebetween, and means for pressing the discs together to cause them to adhere.

References Cited in the file of this patent

UNITED STATES PATENTS

| | | |
|---|---|---|
| 1,692,387 | Schmitt | Nov. 20, 1928 |
| 2,101,607 | Block | Dec. 7, 1937 |
| 2,266,459 | Gilbert | Dec. 16, 1941 |
| 2,351,404 | Colley | June 13, 1944 |
| 2,360,973 | Pedersen | Oct. 24, 1944 |
| 2,436,291 | Daniel | Feb. 17, 1948 |
| 2,560,315 | Triolo | July 10, 1951 |
| 2,589,944 | Labombarde | Mar. 18, 1952 |
| 2,601,125 | O'Conner | June 17, 1952 |
| 2,794,479 | Ganz | June 4, 1957 |
| 2,803,370 | Lennard | Aug. 20, 1957 |
| 2,855,338 | Mulkey | Oct. 7, 1958 |